(12) United States Patent
Kanvinde

(10) Patent No.: US 10,521,446 B2
(45) Date of Patent: Dec. 31, 2019

(54) SYSTEM AND METHOD FOR DYNAMICALLY REFACTORING BUSINESS DATA OBJECTS

(71) Applicant: American Express Travel Related Services Company, Inc., New York, NY (US)

(72) Inventor: Prasad Prakash Kanvinde, Fort Lauderdale, FL (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 319 days.

(21) Appl. No.: 15/431,271

(22) Filed: Feb. 13, 2017

(65) Prior Publication Data

US 2018/0232433 A1 Aug. 16, 2018

(51) Int. Cl.
| | |
|---|---|
| *G06F 7/00* | (2006.01) |
| *G06F 17/30* | (2006.01) |
| *G06F 16/25* | (2019.01) |
| *G06Q 10/06* | (2012.01) |

(52) U.S. Cl.
CPC ....... *G06F 16/25* (2019.01); *G06Q 10/06316* (2013.01)

(58) Field of Classification Search
CPC .............. G06F 17/30604; G06F 16/25; G06F 16/2455; G06Q 10/06316
USPC ......................................... 707/736, 748, 749
See application file for complete search history.

(56) References Cited

U.S. PATENT DOCUMENTS

2005/0044197 A1* 2/2005 Lai ........................ G06Q 10/10
709/223
2017/0154083 A1* 6/2017 Sundaram P ........ G06Q 10/063

* cited by examiner

*Primary Examiner* — Md I Uddin
(74) *Attorney, Agent, or Firm* — Thomas Horstemeyer, LLP

(57) ABSTRACT

A system and method for the dynamic refactoring of business data object classes is provided. The system may comprise a refactoring engine configured to interact with a business process management (BPM) environment. The refactoring engine may retrieve a business data object from the BPM environment. The business data object may include various object linkages, such as object attachments, object assignments, and a business data object audit history. Based on a second business data object class, the refactoring engine may refactor the business data object and the various object linkages.

11 Claims, 2 Drawing Sheets

SYSTEM AND METHOD FOR DYNAMICALLY REFACTORING BUSINESS DATA OBJECTS

FIELD

The disclosure generally relates to accessing and interacting with data using business process management software, and more specifically, to systems and methods for dynamically refactoring business data objects.

BACKGROUND

Large data sets may exist in various sizes and organizational structures. With big data comprising data sets as large as ever, the volume of data collected incident to the increased popularity of online and electronic transactions continues to grow. For example, billions of records (also referred to as rows) and hundreds of thousands of columns worth of data may populate a single table.

Users and business processes may interact with the large data sets in a variety of circumstances. For example, users and business processes may interact with and process large data sets through business process management (BPM) software. BPM software may enable users and business processes to link one or more data tables through the creation of business data objects. Each business data object may comprise a business data object class that links the business data object to various assignments, attachments, indexes, and/or other data tables. In response to a change to the business data object class (e.g., during a BPM software update, creation of a new business data object class, revision of a business data object class, etc.), the business data object and various linked data tables may need to be updated to ensure data integrity and prevent data corruption. The business data objects and/or various linked data tables may need to be updated in production environments and/or in real time. Typically, the business data objects may be manually updated, often causing disruptions to the production environment during the update process.

SUMMARY

Systems, methods, and/or articles of manufacture (collectively, the "system") for dynamically refactoring business data object classes are disclosed. The system may retrieve a business data object, wherein the business data object includes a first business data object class and a first class key. The system may determine a second business data object class for refactoring. The system may refactor the business data object to comprise the second business data object class. The system may generate a second class key based on the refactored business data object. The system may update an object linkage. The object linkage may be linked to the business data object and may include the first class key. The object linkage may be updated by changing the object linkage to include the second class key.

In various embodiments, the system may also receive a business data object refactoring request, wherein the business data object refactoring request includes the first business data object class, the first class key, and the second business data object class. The business data object may be retrieved based on at least one of the first business data object class or the first class key specified by the business data object refactoring request. The business data object refactoring request may also include at least one of a date range, an alphabetical business data object class selection, or a numerical class key selection.

In various embodiments, the object linkage may comprise at least one of an object attachment, an object assignment, or a business data object audit history. The system may also monitor the refactoring of the business data object to detect at least one of an error or a data inconsistency. The system may also restore the refactored business data object back to the business data object in response to detecting at least one of the error or the data inconsistency.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
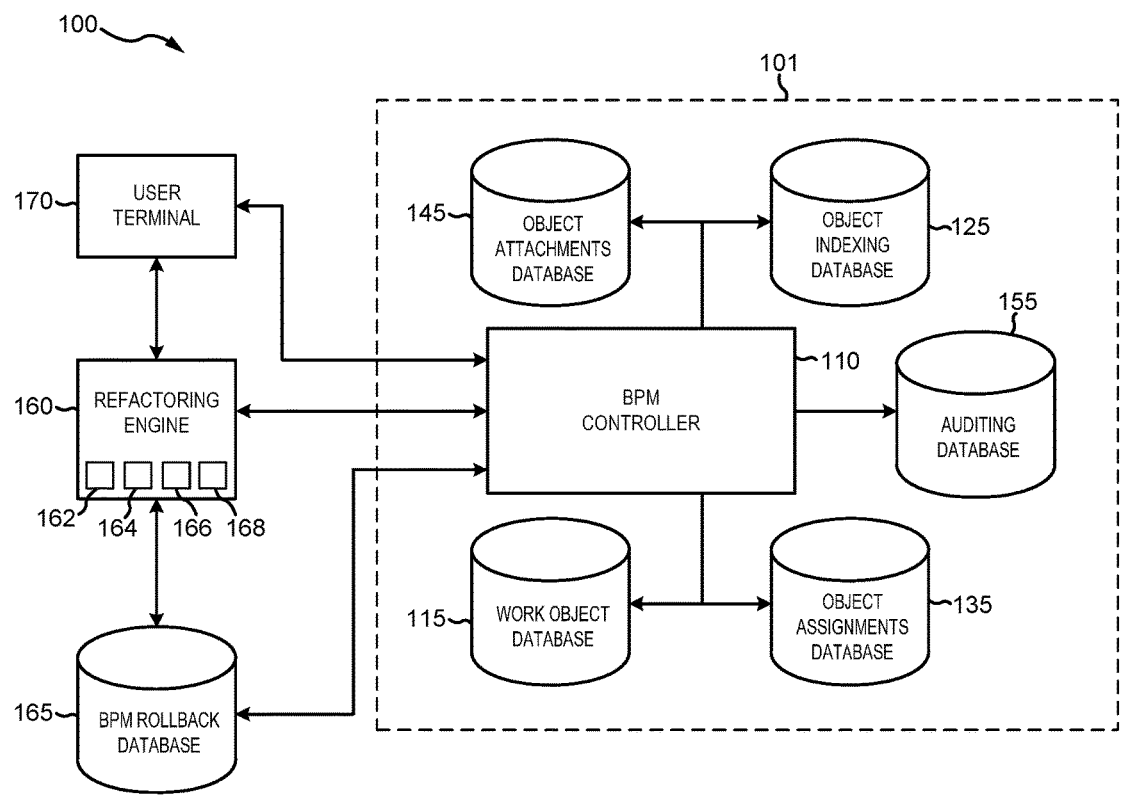
FIG. 1 is a block diagram illustrating various system components of a system for dynamically refactoring business data objects, in accordance with various embodiments.

In various embodiments, and with reference to FIG. 1, a system 100 for dynamically refactoring business data objects is disclosed. In general, system 100 may provide the capability to dynamically refactor and/or restructure business data object classes in real time, in production environments, and/or in any other suitable data environment. In that respect, system 100 may allow for the refactoring of business data objects in production environments at least partially reducing any interruptions, errors, and/or the like caused by updating data relationships in real time. System 100 may allow for dynamic updates of the business data object class for a business data object and/or all linked data and tables as a whole, thus ensuring atomicity, consistency, isolation, and/or durability of the data processing transaction.

In various embodiments, system 100 may comprise various hardware, software, components, modules, and/or the like configured to aid in dynamically refactoring business data object classes. System 100 may comprise a mainframe environment, a business process management (BPM) system (e.g., Oracle® SOA Suite, etc.), and/or the like. For example, system 100 may comprise a BPM environment 101, a refactoring engine 160, a user terminal 170, and/or a BPM rollback database 165. System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein.

In various embodiments, BPM environment 101 may comprise any suitable BPM software, case management platform, customer relationship management (CRM) software, and/or the like, such as, for example, BPM software offered by Pegasystems® (e.g., PEGA PegaRULES Process Commanded (PRPC), etc.), Oracle®, Appian®, and/or any other suitable BPM software vendors. In various embodiments, BPM environment 101 may comprise a BPM controller 110. BPM controller 110 may comprise a central access point for BPM environment 101, as described further herein. BPM environment 101 may also comprise various databases, data tables, and/or the like. For example, BPM environment 101 may comprise a work object database 115, an object indexing database 125, an object assignments database 135, an object attachments database 145, and/or an auditing database 155. Each database may comprise any suitable database, data structure, data table, and/or the like, as described herein. BPM controller 110 may be in electronic communication with each database in BPM environment 101.

In various embodiments, BPM environment 101, via BPM controller 110, may allow users and/or business processes to create, modify, interact with, and/or delete one or more business data objects, as discussed further herein. A business data object may comprise a reusable instantiation of a data structure that proceeds through predefined states according to embedded attributes and/or process transformations. For example, each business data object may include references to one or more databases, data tables, and/or other such data sources. Each business data object may be stored in work object database 115. In that respect, the business data objects may be grouped and/or ordered based on a business group, a business role, and/or any other suitable and/or desired grouping or ordering. The business data objects may be generated by a user via user terminal 170 and BPM controller 110. For example, the user may interact with user terminal 170 to input desired characteristics, relationships, and/or the like for the business data object. BPM controller 110 may generate the business data object according to the input and store the business data object in work object database 115.

In various embodiments, each business data object may comprise one or more object attributes. For example, each business data object may include a business data object class. The business data object class may be an identifier for each corresponding business data object (e.g., "customer," "manager," "sale order," etc.). For example, a "dispute" business data object may be configured to include one or more attributes related to handling a payment dispute, such as, for example, a dispute payment amount, a dispute transaction account number, a geographical region, a geographical mark, and/or the like. As a further example, a "claims" business data object may be configured for businesses handling insurance claims, and/or the like, and may include one or more attributes, such as, for example, a customer identifier, a coverage amount, an owned vehicle, and/or the like. Each business data object class may correspond to a class key. The class key may comprise a numerical and/or alphanumerical tag, identifier, marker, and/or the like indicating the business data object class (e.g., "12345", "a678", etc.).

In various embodiments, each business data object may also include one or more object linkages such as, for example, an object assignment, an object attachment, and/or the like. A business data object index for each business data object may be stored in object indexing database 125. For example, the business data object index may comprise data indicating all object linkages for each corresponding business data object (e.g., a data map of each business data object). Object indexing database 125 may store each business data object index grouped by the corresponding business data object.

In various embodiments, the object assignment may comprise data indicating the users, business groups, and/or the like that each business data object is assigned to. For example, a business data object for a "sale order" may include an object assignment to an "accounts receivable" business group, and/or the like. As a further example, a "disputes" business data object may be assigned to a "service representative" for resolution, a "supervisor" for approval and/or the like. As a further example, an "insurance claim" business data object may be assigned to an "adjuster", a "customer", an "approver" or "manager", and/or the like. BPM controller 110 may store the object assignments in object assignments database 135. The object assignments may be grouped by each corresponding business data object in object assignments database 135. For example, the object assignments may be grouped by business data object class, class key, and/or the like. In that respect, object assignments database 135 may therefore track all object assignments for each corresponding business data object.

In various embodiments, the object attachment may comprise data indicating various data relationships for the business data object. Each business data object may comprise one or more object attachments, wherein each object attachment comprises a link, reference, marker, and/or the like to another folder, database, data table, data entry, and/or the like. For example, a business data object for a "sale order" may include an object attachment to an "accounts receivable" database (e.g., to a transaction account check image, a payment allocation spread sheet, etc.), a data file, a scanned document, a URL, an email, and/or the like. As a further example, an "insurance claim" business data object may include object attachments to accident images, police reports, disclosures, and/or the like. BPM controller 110 may store the object attachments in object attachments database 145. The object attachments may be grouped by each corresponding business data object in object attachments database 145. For example, the object attachments may be grouped by business data object class, class key, and/or the like. In that respect, object attachments database 145 may therefore track all object attachments for each corresponding business data object.

In various embodiments, auditing database 155 may comprise a business data object audit history for each business data object. In that respect, BPM controller 110 may be configured to monitor one or more business data objects. BPM controller 110 may generate the business data object audit history based on the assigning, usage, modifying, and/or otherwise interactions involving each business data object. BPM controller 110 may store one or more of the business data object audit histories in auditing database 155. Auditing database 155 may store one or more business data object audit history grouped by the corresponding business data object. In that respect, business data object audit history may be a historical record for each business data object.

In various embodiments, user terminal 170 may comprise hardware and/or software capable of allowing a user access to system 100. For example, user terminal 170 may comprise any suitable device allowing a user to communicate with a network, such as a personal computer, personal digital assistant, cellular phone, kiosk, and/or the like. User terminal 170 may be in electronic communication with refactoring engine 160. User terminal 170 may be configured to allow the user to communicate with BPM controller 110 to generate, modify, and/or delete business data objects, as discussed further herein. User terminal 170 may also be configured to allow the user to communicate with refactoring engine 160 to initiate the refactoring of one or more business data objects. For example, a user may input into user terminal 170 a desired business data object to refactor. In that regard, the user may input and/or select a business data object class for refactoring, and may select a new business data object class (e.g., a second business data object class) to replace the (first) business data object class. As a further example, a user may also initiate the refactoring of business data objects in a batch and/or other processing quantity. For example, the user may select business data objects for refactoring based on a date range, an alphabetical business data object class selection, a numerical class key selection, and/or any other suitable method of selection. User terminal 170 may generate a business data object refactoring request based on the user input. In that respect, the business data object refactoring request may comprise the (first) business data object class and the corresponding (first) class key for refactoring, and a second business data object class to be updated. User terminal 170 may transmit the business data object refactoring request to refactoring engine 160.

In various embodiments, refactoring engine 160 may be configured to dynamically refactor business data objects. Refactoring engine 160 may be in electronic communication with user terminal 170, BPM rollback database 165, and/or BPM environment 101 (via BPM controller 110). Refactoring engine 160 may comprise one or more modules, engines, and/or the like configured to aid in dynamically refactoring the business data objects. For example, refactoring engine 160 may comprise a restructure case wrapper 162, a change class handler 164, an update linkage engine 166, and/or a persist and cleanup engine 168.

In various embodiments, restructure case wrapper 162 may be configured to receive the data object refactoring request from user terminal 170. Restructure case wrapper 162 may parse the data object refactoring request to determine the first business data object class, the first class key, and/or the second business data object class. Restructure case wrapper 162 may comprise software, hardware, and/or the like capable of allowing restructure case wrapper 162 to receive and parse the data object refactoring request.

In various embodiments, change class handler 164 may be configured to refactor the business data object. Change class handler 164 may comprise software, hardware, and/or the like capable of allowing change class handler 164 to retrieve business data objects and refactor the retrieved business data objects. Change class handler 164 may interact with BPM controller 110 to query work object database 115 to retrieve the business data object. For example, change class handler 164, via BPM controller 110, may query work object database 115 to retrieve the business data object having the first business data object class and/or the first class key specified in the business data object refactoring request. Change class handler 164, via BPM controller 110, may also query work object database 115 to retrieve business data objects within the data range, the alphabetical or numerical selection range, and/or the like specified in the business data object refactoring request. Change class handler 164 may refactor the retrieved business data object by changing the first business data object class included in the business data object to comprise the second business data object class. In response to the business data object comprising the second business data object class, BPM controller 110 may generate the second class key for the business data object. The second class key may be stored in the corresponding business data object. Change class handler 164, via BPM controller 110, may save and/or store the refactored business data object in work object database 115. BPM controller 110 may be configured to monitor and track the refactoring of each business data object, and store backup data corresponding to the business data object in BPM rollback database 165.

In various embodiments, update linkage engine 166 may be configured to update all object linkages corresponding to the refactored business data object. Update linkage engine 166 may comprise software, hardware, and/or the like capable of allowing update linkage engine 166 to update all object linkages corresponding to the refactored business data object. For example, update linkage engine 166 may be configured to update the object assignments for each refactored business data object. Update linkage engine 166 may interact with BPM controller 110 to query object assignments database 135 to retrieve all object assignments related to the refactored business data object. In that respect, update linkage engine 166 may query object assignments database 135 based on the first class key and/or the first business data object class. Update linkage engine 166 may update each object assignment to comprise and/or reference the second class key and/or the second business data object class. In that respect, each object assignment may therefore be correctly re-linked to the refactored business data object. Update linkage engine 166, via BPM controller 110, may save each updated object assignment in object assignments database 135. BPM controller 110 may be configured to monitor and track the updating of each object assignment, and store backup data corresponding to the object assignment in BPM rollback database 165.

In various embodiments, and as a further example, update linkage engine 166 may also be configured to update the object attachments for each refactored business data object. Update linkage engine 166 may interact with BPM controller 110 to query object attachments database 145 to retrieve all object attachments related to the refactored business data object. In that respect, update linkage engine 166 may query object attachments database 145 based on the first class key and/or the first business data object class. Update linkage engine 166 may update each object attachment to comprise and/or reference the second class key and/or the second business data object class. In that respect, each object attachment may therefore be correctly re-linked to the refactored business data object. Update linkage engine 166, via BPM controller 110, may save each updated object attachment in object attachments database 145. BPM controller 110 may be configured to monitor and track the updating of each object attachment, and store backup data corresponding to the object attachment in BPM rollback database 165.

In various embodiments, and as a further example, update linkage engine 166 may also be configured to update the business data object audit history for each refactored business data object. Update linkage engine 166 may interact with BPM controller 110 to query auditing database 155 to retrieve all business data object audit history related to the business data object. In that respect, update linkage engine 166 may query auditing database 155 based on the first class key and/or the first business data object class. Update linkage engine 166 may update each business data object audit history to comprise and/or reference the second class key and/or the second business data object class. In that respect, each business data object audit history may therefore be correctly re-linked to the refactored business data object. Update linkage engine 166 (e.g., via BPM controller 110) may save each updated business data object audit history in auditing database 155. BPM controller 110 may be configured to monitor and track the updating of each business data object audit history, and store backup data corresponding to the business data object audit history in BPM rollback database 165.

In various embodiments, persist and cleanup engine 168 may be configured to persist the refactored business data object, perform the final commit to save the updates, and/or cleanup any outdate objects. Persist and cleanup engine 168 may comprise software, hardware, and/or the like capable of allowing persist and cleanup engine 168 to persist the refactored business data object, perform the final commit to save the updates, and/or cleanup any outdate objects. For example, persist and cleanup engine 168 may instruct BPM controller 110 to query all databases in BPM environment 101 (e.g., work object database 115, object indexing database 125, object assignments database 135, object attachments database 145, and/or auditing database 155) to determine whether there are any remaining entries comprising the first business data object class and/or the first class key. In response to locating a data entry comprising the first business data object class and/or the first class key, persist and cleanup engine 168 may instruct BPM controller 110 to remove the data entry. In response to not locating any data entries comprising the first business data object class and/or the first class key, persist and cleanup engine 168 may instruct BPM controller 110 to persist the refactored business data object and perform a final commit of all changes to BPM environment 101.

In various embodiments, BPM controller 110 may also be configured to perform a rollback to undo the refactoring of the business data object. For example, BPM controller 110 may be configured to perform a rollback in response to receiving any errors, data inconsistencies, and/or the like, or in response to receiving a business data object rollback request from user terminal 170. BPM controller 110 may retrieve the backup data from BPM rollback database 165, and may restore the various databases in BPM environment 101 to a pre-refactoring state. In various embodiments, BPM controller 110 may also be configured to monitor the refactoring, and perform a rollback in response to determining a rollback event (e.g., an error, an unsuccessful commit, etc.). In that regard, BPM controller 110 may monitor an error log and/or the like to determine the rollback event.

Figure 2:
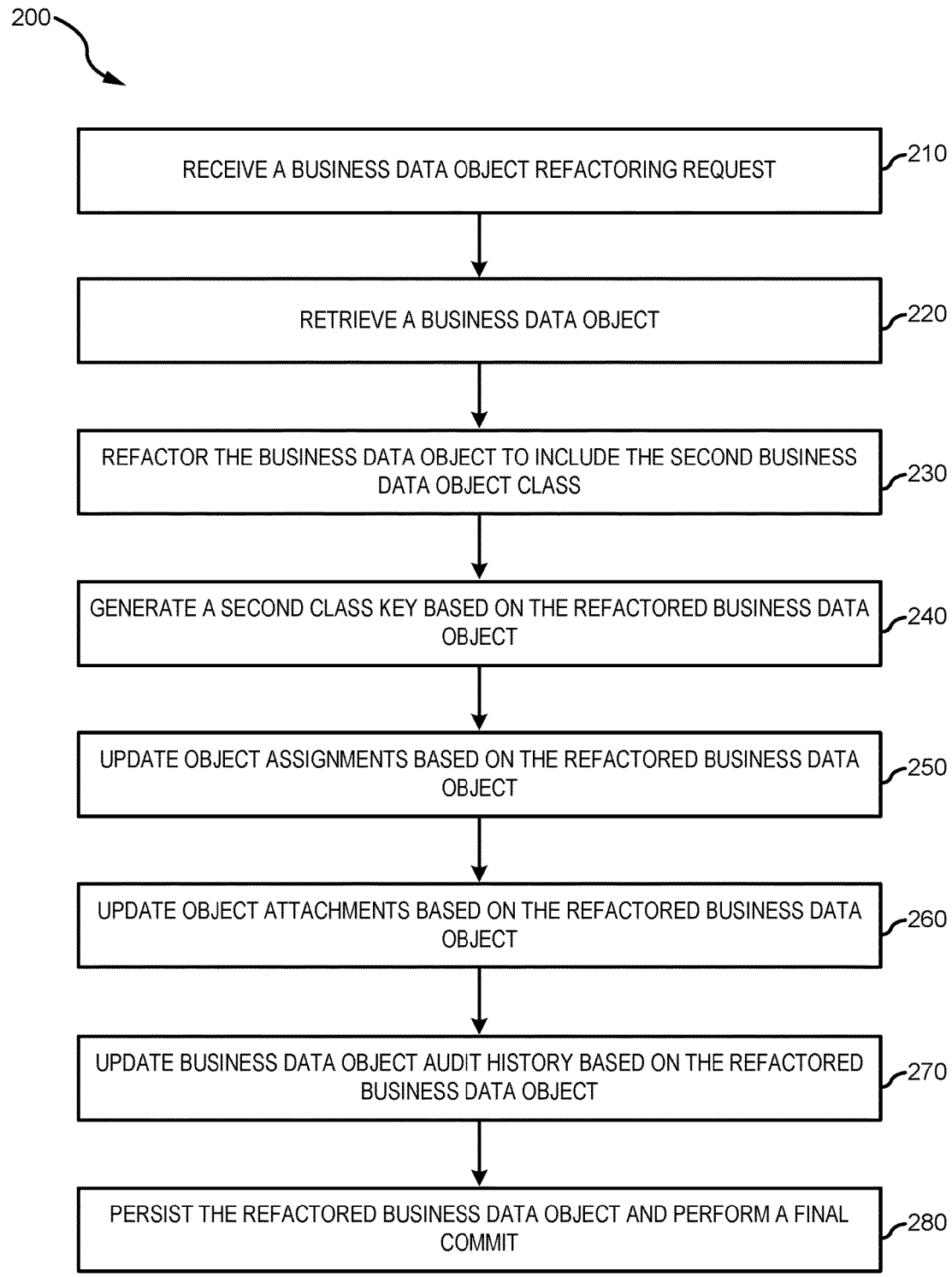
FIG. 2 illustrates a process flow for a method of dynamically refactoring business data objects, in accordance with various embodiments.

Referring now to FIG. 2, the process flow depicted is merely an embodiment and is not intended to limit the scope of the disclosure. For example, the steps recited in any of the method or process descriptions may be executed in any order and are not limited to the order presented. It will be appreciated that the following description makes appropriate references not only to the steps and user interface elements depicted in FIG. 2, but also to the various system components as described above with reference to FIG. 1.

The methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

In various embodiments, and with reference to FIGS. 2 and 1, a method 200 for dynamically refactoring business data objects is disclosed. As previously described, method 200 may provide the capability to dynamically refactor and/or restructure business data object classes in real time, in production environments, and/or in any other suitable data environment. In that respect, method 200 may allow for the refactoring of business data objects in production environments while at least partially reducing any interruptions, errors, and/or the like caused by updating data relationships in real time. Method 200 may allow for dynamic updates of the business data object class for a business data object and/or for all linked data and tables as a whole, thus ensuring atomicity, consistency, isolation, and/or durability of the data processing transaction.

In various embodiments, method 200 may comprise receiving a business data object refactoring request (Step 210). Refactoring engine 160 (e.g., via restructure case wrapper 162) may receive the business data object refactoring request from user terminal 170. The business data object refactoring request may comprise at least one of first business data object class, a first class key, and/or a second business data object class. The business data object refactoring request may also comprise a date range, an alphabetical business data object class selection, a numerical class key selection, and/or the like. Refactoring engine 160 (e.g., via restructure case wrapper 162) may parse the business data object refactoring request to determine the first business data object class, the first class key, and/or the second business data object class. In various embodiments, method 200 may comprise retrieving a business data object (Step 220). Refactoring engine 160, via change class handler 164, may retrieve the business data object based on the business data object refactoring request. For example, refactoring engine 160, via BPM controller 110, may query work object database 115 to retrieve the business data object having the first business data object class and/or the first class key from the business data object refactoring request. Refactoring engine 160 (e.g., via BPM controller 110) may also query work object database 115 to retrieve business data objects within the data range, the alphabetical or numerical selection range, and/or the like from the business data object refactoring request.

In various embodiments, method 200 may comprise refactoring the business data object to include the second business data object class (Step 230). Refactoring engine 160 (e.g., via change class handler 164) may refactor the business data object. In that regard, refactoring engine 160 (e.g., via change class handler 164) may change the first business data object class in the business data object to comprise the second business data object class. Method 200 may also comprise generating a second class key based on the refactored business data object (Step 240). In response to the business data object comprising the second business data object class, BPM controller 110 may generate the second class key for the business data object. The second class key may be stored in the corresponding business data object. Refactoring engine 160, via BPM controller 110, may save and/or store the refactored business data object in work object database 115. BPM controller 110 may be configured to monitor and track the refactoring of each business data object, and store backup data corresponding to the business data object in BPM rollback database 165.

In various embodiments, method 200 may comprise updating object assignments based on the refactored business data object (Step 250). Refactoring engine 160 (e.g., via update linkage engine 166) may update the object assignments for the corresponding refactored business data object. Refactoring engine 160 (e.g., via BPM controller 110) may query object assignments database 135 to retrieve all object assignment related to the business data object. In that respect, refactoring engine 160 may query object assignments database 135 based on the first class key and/or the first business data object class. Refactoring engine 160 may update each object assignment to comprise and/or reference the second class key and/or the second business data object class. In that respect, each object assignment may therefore be correctly re-linked to the refactored business data object. Refactoring engine 160 (e.g., via BPM controller 110) may save each updated object assignment in object assignments database 135. BPM controller 110 may be configured to monitor and track the updating of each object assignment, and store backup data corresponding to the object assignment in BPM rollback database 165.

In various embodiments, method 200 may comprise updating object attachments based on the refactored business data object (Step 260). Refactoring engine 160 (e.g., via update linkage engine 166) may update the object attachments for the corresponding refactored business data object. Refactoring engine 160 (e.g., via BPM controller 110) may query object attachments database 145 to retrieve all object attachments related to the business data object. In that respect, refactoring engine 160 may query object attachments database 145 based on the first class key and/or the first business data object class. Refactoring engine 160 may update each object attachment to comprise and/or reference the second class key and/or the second business data object class. In that respect, each object attachment may therefore be correctly re-linked to the refactored business data object. Refactoring engine 160 (e.g., via BPM controller 110) may save each updated object attachment in object attachments database 145. BPM controller 110 may be configured to monitor and track the updating of each object attachment, and store backup data corresponding to the object attachment in BPM rollback database 165.

In various embodiments, method 200 may comprise updating business data object audit history based on the refactored business data object (Step 270). Refactoring engine 160 (e.g., via update linkage engine 166) may update the business data object audit history for the corresponding refactored business data object. Refactoring engine 160 (e.g., via BPM controller 110) may query auditing database 155 to retrieve all business data object audit history related to the business data object. In that respect, refactoring engine 160 may query auditing database 155 based on the first class key and/or the first business data object class. Refactoring engine 160 may update each business data object audit history to comprise and/or reference the second class key and/or the second business data object class. In that respect, each business data object audit history may therefore be correctly re-linked to the refactored business data object. Refactoring engine 160 (e.g., via BPM controller 110) may save each updated business data object audit history in auditing database 155. BPM controller 110 may be configured to monitor and track the updating of each business data object audit history, and store backup data corresponding to the business data object audit history in BPM rollback database 165.

In various embodiments, method 200 may comprise persisting the refactored business data object and performing a final commit (Step 280). Refactoring engine 160 (e.g., via persist and cleanup engine 168) may be configured to persist the refactored business data object and perform the final commit. For example, refactoring engine 160 may instruct BPM controller 110 to query all databases in BPM environment 101 (e.g., work object database 115, object indexing database 125, object assignments database 135, object attachments database 145, and/or auditing database 155) to determine whether there are any remaining entries comprising the first business data object class and/or the first class key. In response to locating a data entry comprising the first business data object class and/or the first class key, BPM controller 110 may be configured to delete the entry. In response to not locating any data entries comprising the first business data object class and/or the first class key, BPM controller 110 may be configured to persist the refactored business data object and perform a final commit of all changes to BPM environment 101. After the final commit, BPM controller 110 may update object indexing database 125 to comprise a refactored business data object index for each refactored business data object. In response to receiving any errors, data inconsistencies, and/or the like, BPM controller 110 may perform a rollback to undo the refactoring of the business data object. For example, BPM controller 110 may retrieve the backup data from BPM rollback database 165, and may restore the various databases in BPM environment 101 back to the pre-refactoring state.

The disclosure and claims do not describe only a particular outcome of dynamically refactoring business data objects, but the disclosure and claims include specific rules for implementing the outcome of dynamically refactoring business data objects and that render information into a specific format that is then used and applied to create the desired results of dynamically refactoring business data objects, as set forth in *McRO, Inc. v. Bandai Namco Games America Inc.* (Fed. Cir. case number 15-1080, Sep. 13, 2016). In other words, the outcome of dynamically refactoring business data objects can be performed by many different types of rules and combinations of rules, and this disclosure includes various embodiments with specific rules. While the absence of complete preemption may not guarantee that a claim is eligible, the disclosure does not sufficiently preempt the field of dynamically refactoring business data objects at all. The disclosure acts to narrow, confine, and otherwise tie down the disclosure so as not to cover the general abstract idea of just dynamically refactoring business data objects. Significantly, other systems and methods exist for dynamically refactoring business data objects, so it would be inappropriate to assert that the claimed invention preempts the field or monopolizes the basic tools of dynamically refactoring business data objects. In other words, the disclosure will not prevent others from dynamically refactoring business data objects, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility,* 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system may include alerting a user when their computer (e.g., user terminal 170) is offline. The system may include generating customized information and alerting a remote user that the information can be accessed from their computer (e.g., user terminal 170). The alerts are generated by filtering received information, building information alerts and formatting the alerts into data blocks based upon user preference information. The data blocks are transmitted to the user's wireless device which, when connected to the computer, causes the computer to auto-launch an application to display the information alert and provide access to more detailed information about the information alert. More particularly, the system may comprise providing a viewer application to a user for installation on the remote user computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote user computer and to enable connection via the URL to the data source over the Internet when the wireless device is locally connected to the remote user computer and the remote user computer comes online.

In various embodiments, the system may include a graphical user interface for dynamically relocating/rescaling obscured textual information of an underlying window to become automatically viewable to the user. By permitting textual information to be dynamically relocated based on an overlap condition, the computer's (e.g., user terminal 170) ability to display information is improved. More particularly, the system may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., the business data object refactoring request) to prevent a computer (e.g., user terminal 170) from being compromised, for example by being infected with a computer virus, when a user requests or interacts with virtual tokens. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over users during name, using a system for co-marketing the "look and feel" of the host web page (e.g., a web page hosted by system 100) with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer, via user terminal 170, for example, so that she effectively remains on the host web page to search for a name without being redirected to the third party merchant affiliate. Because such composite pages are visually perceived by the customer as associated with the host web page, they give the customer the impression that she is viewing pages served by the host. Further, the customer is able to search for a name without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

As used herein, "transmit" may include sending electronic data from one system component to another over a network connection. Additionally, as used herein, "data" may include encompassing information such as commands, queries, files, data for storage, and the like in digital or any other form.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to an "party" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

As used herein, big data may refer to partially or fully structured, semi-structured, or unstructured data sets including millions of rows and hundreds of thousands of columns.

A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. Record of Charge (ROC) data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system may also include a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MAC-BOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACK-BERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICRO-SOFT® Corporation (Redmond, Wash.), MySQL by MySQL AB (Uppsala, Sweden), MongoDB®, Redis®, Apache Cassandra®, or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED.

Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is intended to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:

retrieving, by a refactoring engine using a query to a work object database and in response to receiving a business data object refactoring request, a business data object, wherein the business data object comprises a reusable instantiation of a data structure that proceeds through predefined states according to embedded attributes and process transformations, and wherein the business data object includes a first business data object class and a first class key;

parsing, by the refactoring engine, the business data object refactoring request to determine the first business data object class, the first class key, and a second business data object class for refactoring;

refactoring in real time, by the refactoring engine, the business data object to create a refactored business data object that comprises the second business data object class by changing the first business data object class in the business data object to comprise the second business data object class;

generating, by the refactoring engine, a second class key based on the refactored business data object, in response to the business data object comprising the second business data object class;

querying, by the refactoring engine, an object linkage database to retrieve an object linkage related to the business data object including an object attachment, an object assignment and a business data object audit history, based on the first class key and the first business data object class;

updating, by the refactoring engine, the object linkage including the object attachment, the object assignment, the business data object audit history, the second class key and the second business data object class;

re-linking, by the refactoring engine, the object linkage to the refactored business data object that is stored in an object indexing database comprising data indicating all object linkages for each corresponding business data object;

monitoring, by the refactoring engine, the refactoring of the business data object for detecting at least one of an error or a data inconsistency; and restoring, by the refactoring engine, the refactored business data object back to the business data object, in response to the detecting at least one of the error or the data inconsistency.

2. The method of claim 1, further comprising receiving, by the refactoring engine, the business data object refactoring request.

3. The method of claim 2, wherein the business data object is retrieved based on at least one of the first business data object class or the first class key specified by the business data object refactoring request.

4. The method of claim 3, wherein the business data object refactoring request includes at least one of a date range, an alphabetical business data object class selection, or a numerical class key selection.

5. The method of claim 1, further comprising:
storing, by the refactoring engine, the second class key in the business data object;
storing, by the refactoring engine, the refactored business data object in the work object database; and
storing, by the refactoring engine, the object linkage in the object linkage database.

6. The method of claim 1, further comprising persisting, by the refactoring engine, the refactored business data object and performing a final commit.

7. A system comprising:
a processor; and
a tangible, non-transitory memory configured to communicate with the processor,
the tangible, non-transitory memory having instructions stored thereon that, in response to execution by the processor, cause the processor to perform operations comprising:
retrieving, by the processor using a query to a work object database and in response to receiving a business data object refactoring request, a business data object,
wherein the business data object comprises a reusable instantiation of a data structure that proceeds through predefined states according to embedded attributes and process transformations, and
wherein the business data object includes a first business data object class and a first class key;
parsing, by the processor, the business data object refactoring request to determine the first business data object class, the first class key, and a second business data object class for refactoring;
refactoring in real time, by the processor, the business data object to create a refactored business data object that comprises the second business data object class by changing the first business data object class in the business data object to comprise the second business data object class;
generating, by the processor, a second class key based on the refactored business data object, in response to the business data object comprising the second business data object class;
querying, by the processor, an object linkage database to retrieve an object linkage related to the business data object including an object attachment, an object assignment and a business data object audit history, based on the first class key and the first business data object class;
updating, by the processor, the object linkage including the object attachment, the object assignment, the business data object audit history, the second class key and the second business data object class;
re-linking, by the processor, the object linkage to the refactored business data object that is stored in an object indexing database comprising data indicating all object linkages for each corresponding business data object;
monitoring, by the processor, the refactoring of the business data object for detecting at least one of an error or a data inconsistency; and
restoring, by the processor, the refactored business data object back to the business data object, in response to the detecting at least one of the error or the data inconsistency.

8. An article of manufacture including a non-transitory, tangible computer readable storage medium having instructions stored thereon that, in response to execution by a computer based system, cause the computer based system to perform operations comprising:
retrieving, by the computer based system using a query to a work object database and in response to receiving a business data object refactoring request, a business data object,
wherein the business data object comprises a reusable instantiation of a data structure that proceeds through predefined states according to embedded attributes and process transformations, and
wherein the business data object includes a first business data object class and a first class key;
parsing, by the computer based system, the business data object refactoring request to determine the first business data object class, the first class key, and a second business data object class for refactoring;
refactoring in real time, by the computer based system, the business data object to create a refactored business data object that comprises the second business data object class by changing the first business data object class in the business data object to comprise the second business data object class;
generating, by the computer based system, a second class key based on the refactored business data object, in response to the business data object comprising the second business data object class;
querying, by the computer based system, an object linkage database to retrieve an object linkage related to the business data object including an object attachment, an object assignment and a business data object audit history, based on the first class key and the first business data object class;

updating, by the computer based system, the object linkage including the object attachment, the object assignment, the business data object audit history, the second class key and the second business data object class;

re-linking, by the computer based system, the object linkage to the refactored business data object that is stored in an object indexing database comprising data indicating all object linkages for each corresponding business data object;

monitoring, by the computer based system, the refactoring of the business data object for detecting at least one of an error or a data inconsistency; and restoring, by the computer based system, the refactored business data object back to the business data object, in response to the detecting at least one of the error or the data inconsistency.

9. The article of manufacture of claim 8, further comprising receiving, by the computer based system, the business data object refactoring request.

10. The article of manufacture of claim 9, wherein the business data object is retrieved based on at least one of the first business data object class or the first class key specified by the business data object refactoring request.

11. The article of manufacture of claim 9, wherein the business data object refactoring request includes at least one of a date range, an alphabetical business data object class selection, or a numerical class key selection.

* * * * *